(12) United States Patent
Schwenger et al.

(10) Patent No.: US 12,337,765 B2
(45) Date of Patent: Jun. 24, 2025

(54) VEHICLE DISPLAY SYSTEM WITH HEIGHT ADJUSTMENT

(71) Applicant: MOTHERSON INNOVATIONS COMPANY LIMITED, London (GB)

(72) Inventors: Tobias Schwenger, Stuttgart (DE); Levente Acs, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 262 days.

(21) Appl. No.: 18/250,243

(22) PCT Filed: Nov. 15, 2021

(86) PCT No.: PCT/EP2021/081637
§ 371 (c)(1),
(2) Date: Apr. 24, 2023

(87) PCT Pub. No.: WO2022/106335
PCT Pub. Date: May 27, 2022

(65) Prior Publication Data
US 2024/0017678 A1    Jan. 18, 2024

(30) Foreign Application Priority Data
Nov. 20, 2020  (DE) .................... 10 2020 130 777.2

(51) Int. Cl.
*B60R 11/02* (2006.01)
*B60R 11/00* (2006.01)

(52) U.S. Cl.
CPC ..... *B60R 11/0235* (2013.01); *B60R 2011/008* (2013.01)

(58) Field of Classification Search
CPC ........... B60R 11/0235; B60R 2011/008; B60R 2011/0084; B60R 2011/0087;
(Continued)

(56) References Cited

U.S. PATENT DOCUMENTS

| 5,305,381 A | 4/1994 | Wang et al. |
| 8,201,784 B2 * | 6/2012 | Tang ..................... F16M 11/10 |
| | | 248/162.1 |

(Continued)

FOREIGN PATENT DOCUMENTS

WO    2020/018965    1/2020

OTHER PUBLICATIONS

Patent Cooperation Treaty, PCT/EP2021/081637, International Search Report and Written Opinion, Feb. 4, 2022.

*Primary Examiner* — Nathnael Aynalem
(74) *Attorney, Agent, or Firm* — Jones Day (57) ABSTRACT

The present invention refers to a vehicle display system, which comprises: a bracket; at least one bracket support member wherein the bracket support member comprises a receiving cavity to retain the bracket; a display cover coupled to the at least one bracket support member; a display adapter coupled to the display cover; and at least one adjustment mechanism coupled to the display cover, wherein the adjustment mechanism comprises at least one mounting member that couples to the display adapter, wherein the mounting member comprises at least a first bracket element and a second bracket element; a lever that is slidably engaged within the first bracket element; and a biasing element supported by the second bracket element; wherein the biasing member cooperates with the lever such that, when a first force is applied to the lever the biasing member is compressed to enable the adjustment mechanism to be translated to a desired position.

26 Claims, 12 Drawing Sheets

(58) Field of Classification Search
CPC ..... B60R 2011/0089; B60R 2011/0091; B60R 2300/205; B60R 2011/0022; B60R 2011/0007; B60R 2011/0005; B60R 2011/0003; F16M 11/043; F16M 11/045; F16M 11/046; F16M 11/048
USPC ........................................................ 348/837
See application file for complete search history.

(56) References Cited

U.S. PATENT DOCUMENTS

| | | | |
|---|---|---|---|
| 9,358,929 B1 | 6/2016 | Huebner et al. | |
| 2017/0082237 A1* | 3/2017 | Yeh ........................ | F16M 11/18 |
| 2019/0263327 A1* | 8/2019 | Sautter ................ | B60R 11/0235 |

* cited by examiner

VEHICLE DISPLAY SYSTEM WITH HEIGHT ADJUSTMENT

CROSS-REFERENCE TO RELATED APPLICATION

This application is a is a National Stage Entry of International Patent Application No. PCT/EP2021/081637, filed on Nov. 15, 2021, which claims the benefit of priority to German Patent Application No. DE 10 2020 130 777.2, filed on Nov. 20, 2020, each of which is hereby incorporated by reference in its entirety for all purposes.

FIELD

The present disclosure relates to a vehicle display system.

BACKGROUND

Vehicles are increasingly moving toward implementation of cameras and electronic display systems to provide additional safety and security systems. The placement of such a display system needs to be visible to the driver in order to access the information provided and be retained in the event of an impact scenario. Current display systems are not efficient at retaining the respective position of the display system and do not account for differences in driver eye height. Additionally, current display systems require specific tooling to facilitate the adjustment of the display system. This results in the user requiring additional time and difficulty to adjust the display system.

It is the object of this invention to provide a vehicle display system with height adjustment that overcomes at least some of the drawback of the prior art.

SUMMARY

Said object is solved by a vehicle display system, which comprises: a bracket; at least one bracket support member wherein the bracket support member comprises a receiving cavity to retain the bracket; a display cover coupled to the at least one bracket support member; a display adapter coupled to the display cover; and at least one adjustment mechanism coupled to the display cover, wherein the adjustment mechanism comprises at least one mounting member that couples to the display adapter, wherein the mounting member comprises at least one first bracket element and at least one second bracket element; a lever that is slidably engaged within the first bracket element; and a biasing element supported by the second bracket element; wherein the biasing member cooperates with the lever such that, when a first force is applied to the lever the biasing member is compressed to enable the adjustment mechanism to be translated to a desired position.

The bracket may be mounted to an attachment component for facilitating coupling to a vehicle directly or indirectly. This attachment component may be configured for driver side and/or passenger side mounting. An example attachment component is describe in U.S. 63/065,627 with the title "Vehicle Display Retention Assembly" filed on Aug. 14, 2020, hereby incorporated by reference, and reference is made thereto with respect to attachment details.

According to the invention it is preferred that the vehicle display system further comprises at least one fastening member for coupling the display adapter to the display cover such that, when the fastening member is loosened, the adjustment mechanism is functional to enable movement of the display cover in relation to the bracket, and, when the fastening member is tightened, the movement of the adjustment mechanism is restricted.

It is proposed that each fastening member comprises a locking lever, with the locking lever preferably being rotatable between an open position loosening the fastening member and a closed position tightening the fastening member, and/or each fastening member comprising an eccentric screw.

Preferred embodiments of the vehicle display system according to the invention further comprise at least one first gasket located between the bracket support member and the display cover, and/or at least second first gasket located between the display cover and the display adapter, with preferably each second gasket being designed to fit on one fastening member.

It is also proposed that at least one tolerance biasing element is located between the display cover and the first gasket, preferably arranged on either the inside or outside of the bracket support member.

Further, it is proposed that the tolerance biasing element cooperates with a side wall of the bracket support member and the display cover to ensure alignment of the bracket support member, and/or the tolerance biasing element cooperates with the display adapter and the bracket support member to ensure a proper mounted alignment.

According to the invention it is also proposed that the adjustment mechanism further comprises an adjustment pin that cooperates with the biasing element; and an adjustment rod that cooperates with the adjustment pin, with the adjustment rod preferably being integrally connected to the bracket or detachably coupled to the bracket.

In addition, embodiments of the present invention can be further characterized by a dividing wall, wherein the cover has the dividing wall as a physical barrier separating two adjustment mechanisms, and/or the biasing members of two adjustment mechanisms cooperate with the respective levers and the dividing wall such that, when a first force is applied to the levers the biasing members are compressed against the dividing wall to enable the adjustment mechanisms and a display screen to be translated to a desired height position, and/or, per adjustment mechanism, the lever engages and compresses the biasing member against the dividing wall for translating the adjustment pin out of the corresponding geometry of the adjustment rod.

Still further, it is proposed that there are two or four adjustment mechanisms, with each fastening member preferably cooperating with one adjustment mechanism retaining the location of the display cover in relation to the bracket, when the fastening member is in a locked position.

It is preferred according to the invention that there are at least two bracket support members between which the bracket can be vertically moved for a height adjustment, with preferably the bracket support members providing a dovetail guiding.

It is also proposed that there are four bracket support members located in proximity to the four corners of the bracket, and/or there are two first gaskets located between each bracket support member and the display cover, with preferably the first gaskets being injected into the display system during assembly.

Embodiments of the invention can further comprise at least one display screen coupled with the display adapter; wherein preferably a bezel encases the display screen.

In addition, it is proposed that the display screen comprises bonded glass.

Still further, it is proposed that the display adapter and/or the bracket is constructed from aluminum or a high-tech plastic material.

An electromagnetic shield adapter unit for cooling electric components of the vehicle display system, in particular its electronic control unit, may also be used, for example in form of the unit describe in U.S. 63/065,606 with the title "Electromagnetic Shielding (EMC) Adapter within Vehicle Display Unit" filed on Aug. 14, 2020, hereby incorporated by reference, and reference is made thereto with respect to the respective structural details.

BRIEF DESCRIPTION OF THE DRAWINGS

The present invention will be better understood from the following description of preferred embodiments which are described with respect to the accompanying drawings, in which.

DETAILED DESCRIPTION

Figure 1A:
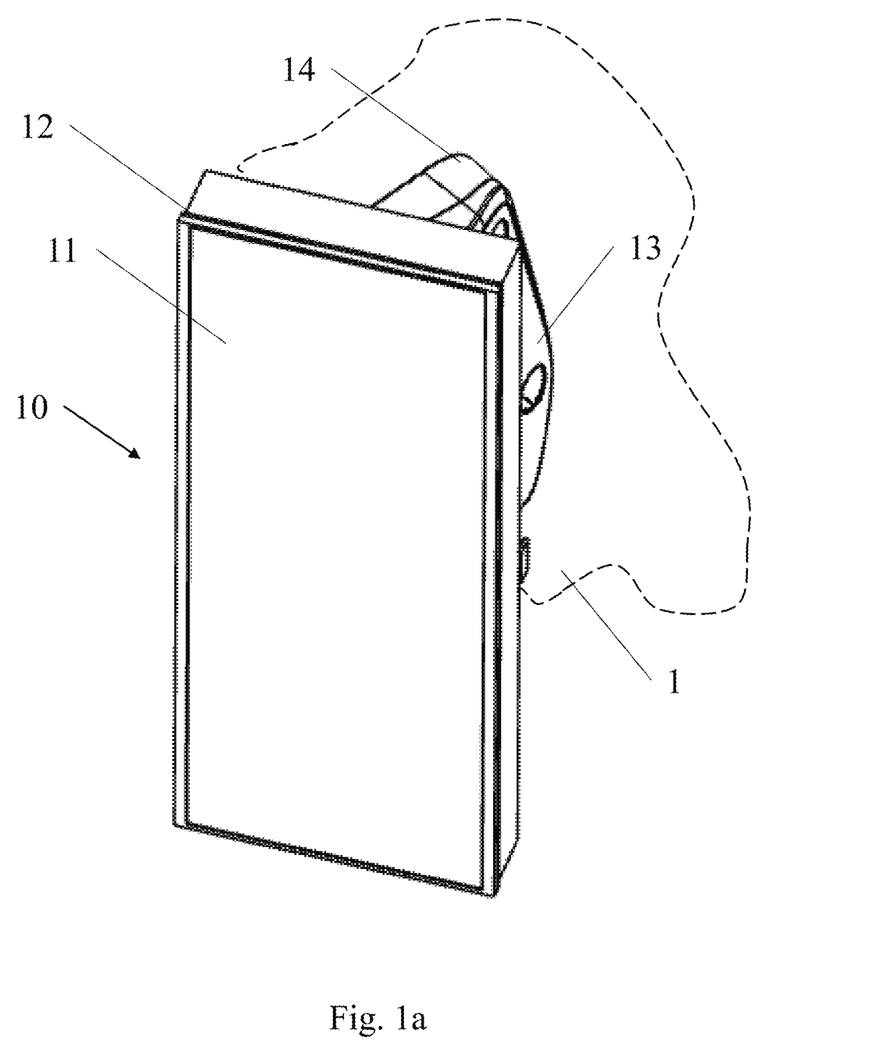
FIG. 1a depicts an isometric perspective view of a vehicle display system.
Figure 1B:
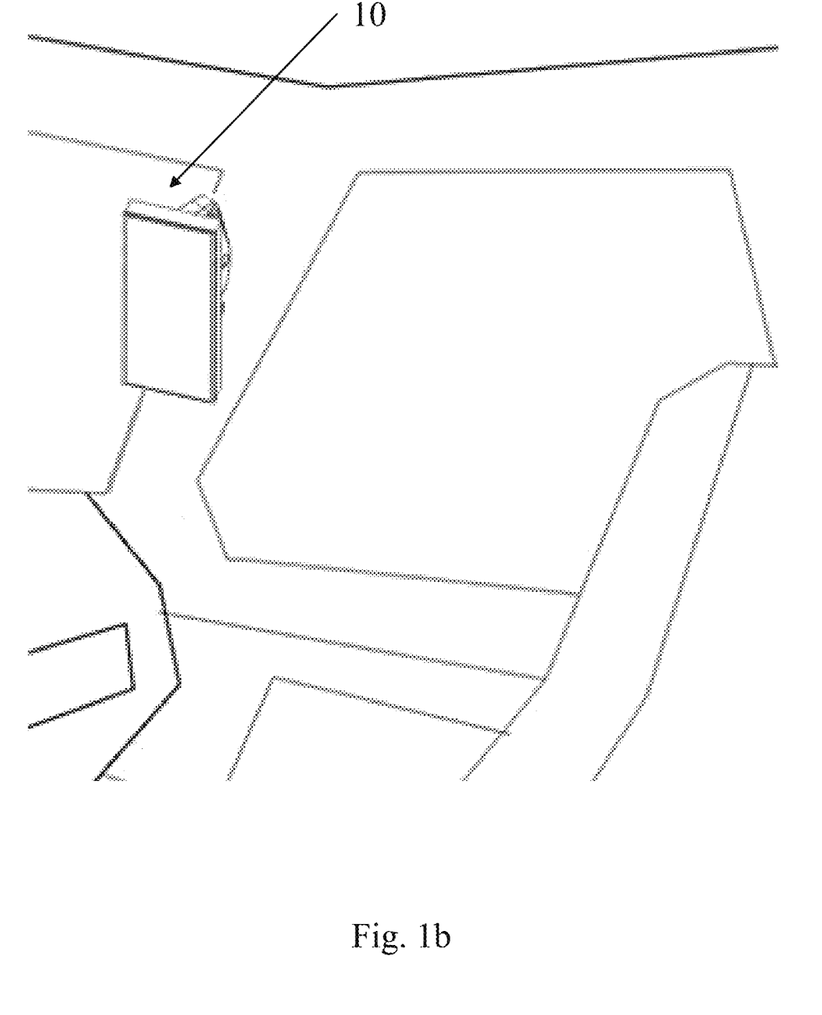
FIG. 1B depicts the vehicle display system mounted to an A-pillar of a vehicle.

The following description is merely exemplary in nature and is not intended to limit the present disclosure, application, or uses. It should be understood that throughout the drawings, corresponding reference numerals indicate like or corresponding parts and features. FIG. 1a depicts an isometric perspective view of a display system 10 for a vehicle 1. The display system 10 comprises a display screen 11 and a bezel 12. The bezel 12 surrounds the display screen 11, wherein the display screen 11 is a form of bonded glass. Further, the bezel 12 may be configured to accept paint to alter the appearance of the bezel 12. The display system further comprises an inner bracket cover 13 and an outer bracket cover 14. The outer bracket cover 14 and inner bracket cover 13 cooperate to provide protection and improved appearance for a bracket 16, shown in FIG. 2. The bracket 16 provides a means for attachment of the display system 10 to a vehicle 1. The bracket 16 may be mounted to an attachment component for facilitating coupling to the vehicle directly or indirectly. This attachment component may be configured for driver side and/or passenger side mounting. An example attachment component is describe in U.S. 63/065,627 with the title "Vehicle Display Retention Assembly" filed on Aug. 14, 2020, hereby incorporated by reference, and reference is made thereto with respect to attachment details. In the configuration of FIG. 1B the display system 10 mounts to a vehicle A-pillar. In other configurations the display system may mount to a vehicle door, a windshield, a grab bar attached to the vehicle, or any other vehicle structure.

FIG. 1B depicts the display system 10 mounted to the A-pillar of the vehicle 1, with the display system 10 being adjustable up to 75 mm while maintaining crash safety requirements. The adjustability of this design enables movement of the perpendicular of the display system 10 to align with the eyes of the driver (not shown). This design also allows for the adjustment of the display system 10 without additional tooling such as screw drivers, hammers, hex keys, or similar devices.

Figure 2:
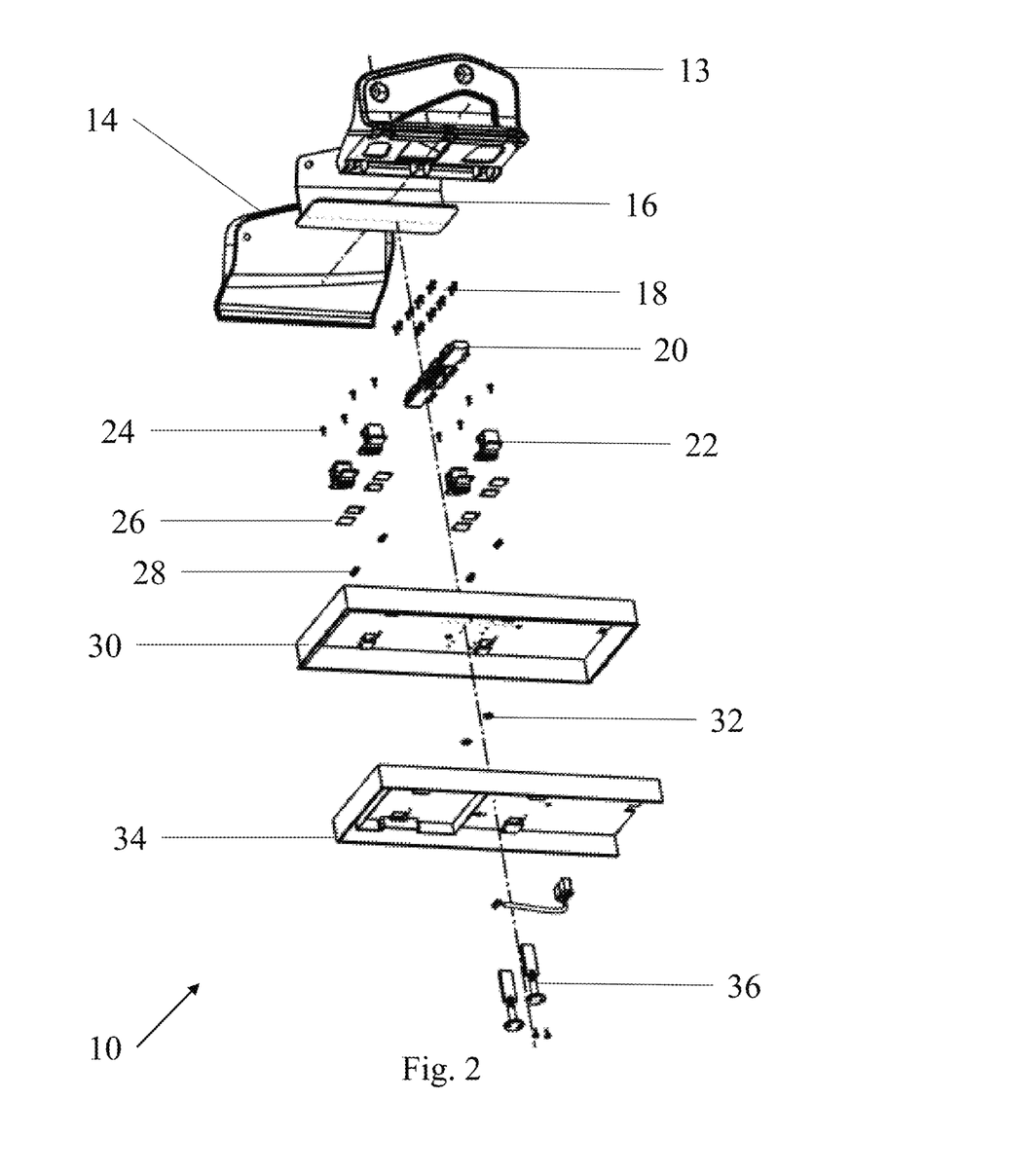
FIG. 2 depicts an exploded view of a vehicle display height adjustment assembly.

FIG. 2 depicts an exploded view of the display system 10 emphasizing a vehicle display height adjustment assembly. The inner bracket cover 13 and the outer bracket cover 14 cooperate with the bracket 16. The bracket 16 facilitates the connection between the display system 10 and the vehicle 1 by attaching to the A-pillar. The bracket 16 is coupled to a display cover 30 via at least two bracket support members 22. In this configuration, there are four bracket support members 22 located in proximity to the four corners of the bracket 16. The bracket 16 is designed to be slidably coupled within the bracket support members 22. The bracket support members 22 are coupled to the display cover 30 and a display adapter 34 via at least one bracket support fastener 24. In this configuration, two bracket support fasteners 24 are used for each bracket support member 22 and are located in opposite corners of the bracket support member 22.

In this configuration the display adapter 34 and the bracket 16 are constructed from aluminum or a high-tech plastic material. These material ensure forces applied to the display system are structurally received and contained by the display adaptor 34 or the bracket 16.

An electromagnetic shield adapter unit for cooling electric components of the vehicle display system, in particular its electronic control unit, may be used, for example in form of the unit describe in U.S. 63/065,606 with the title "Electromagnetic Shielding (EMC) Adapter within Vehicle Display Unit" filed on Aug. 14, 2020, hereby incorporated by reference, and reference is made thereto with respect to the respective structural details.

At least one first gasket 26 is located between the bracket support member 22 and the display cover 30. Each first gasket 26 reduces system vibration, and may seal the system to inhibit the transfer of contaminants. In this configuration two first gaskets 26 are located between each bracket support member 22 and the display cover 30. In this configuration the first gaskets 26 are injected into the display system 10 during assembly. In other variations the first gaskets 26 may be incorporated into the display system 10 via other means during assembly as well.

Located between the display cover 30 and the first gaskets 26 is at least one tolerance biasing element 28. In this configuration there is one tolerance biasing element 28 with each bracket support member 22. In other configurations there may be more than one tolerance biasing element 28. Each tolerance biasing element 28 may be located on either the inside or outside of the bracket support member 22.

Figure 5:
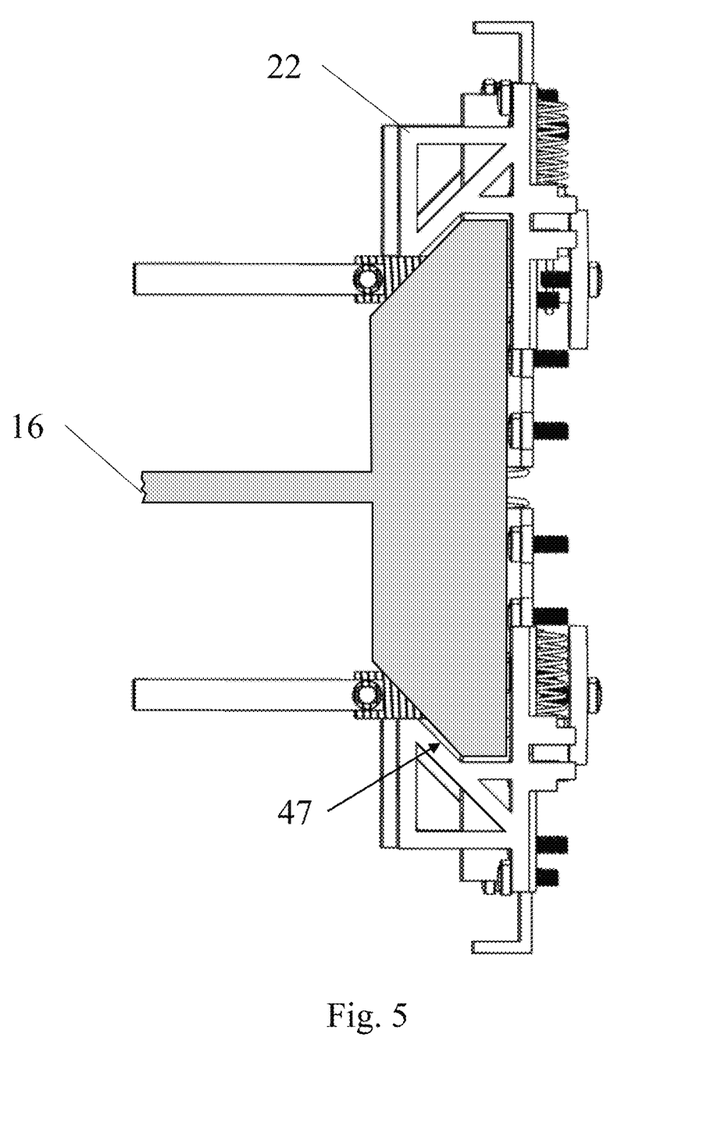
FIG. 5 depicts a top perspective view of the vehicle display height adjustment assembly with the covers removed.

The tolerance biasing elements 28 cooperate with a side wall 45, see FIG. 5, of the bracket support member 22 and the display cover 30 to ensure alignment of the bracket support member 22. In other configurations the tolerance biasing element 28 may cooperate with the display adapter 34 and the bracket support member 22 to ensure a proper mounted alignment.

Additionally, an adjustment mechanism 20 is coupled to the display cover 30 and display adapter 34 via at least one adjustment mechanism fastener 18 and positioned between the display cover 30 and the bracket 16. The height of the display system 10 may be adjusted by the cooperation of the adjustment mechanism 20 with the display cover 30 and the bracket 16. In this configuration there are two adjustment mechanisms 20. However, other designs may have more or less adjustment mechanisms 20 to meet design requirements.

The display adapter 34 is coupled to the display cover 30. At least one fastening member 36 cooperates with the display adapter 34 and the display cover 30. When the fastening member 36 is loosened, the adjustment mechanism 20 is functional to enable movement of the display cover 30 in relation to the bracket 16. Whereas, when the fastening member 36 is tightened, the movement of the adjustment mechanism 20 is restricted. In this configuration there are two fastening members 36, which are eccentric screws. Alternatively, there can be more or less of these in other configurations to comply with design requirements.

Between the display cover 30 and the display adapter 34 is at least one second gasket 32 designed to fit on the fastening member 36. Each second gasket 32 is able to reduce vibration, and seal the system to inhibit the transfer of contaminants. In this configuration there are two second gaskets 32, but in other configurations there may be more or less to meet design requirements.

Figure 3:
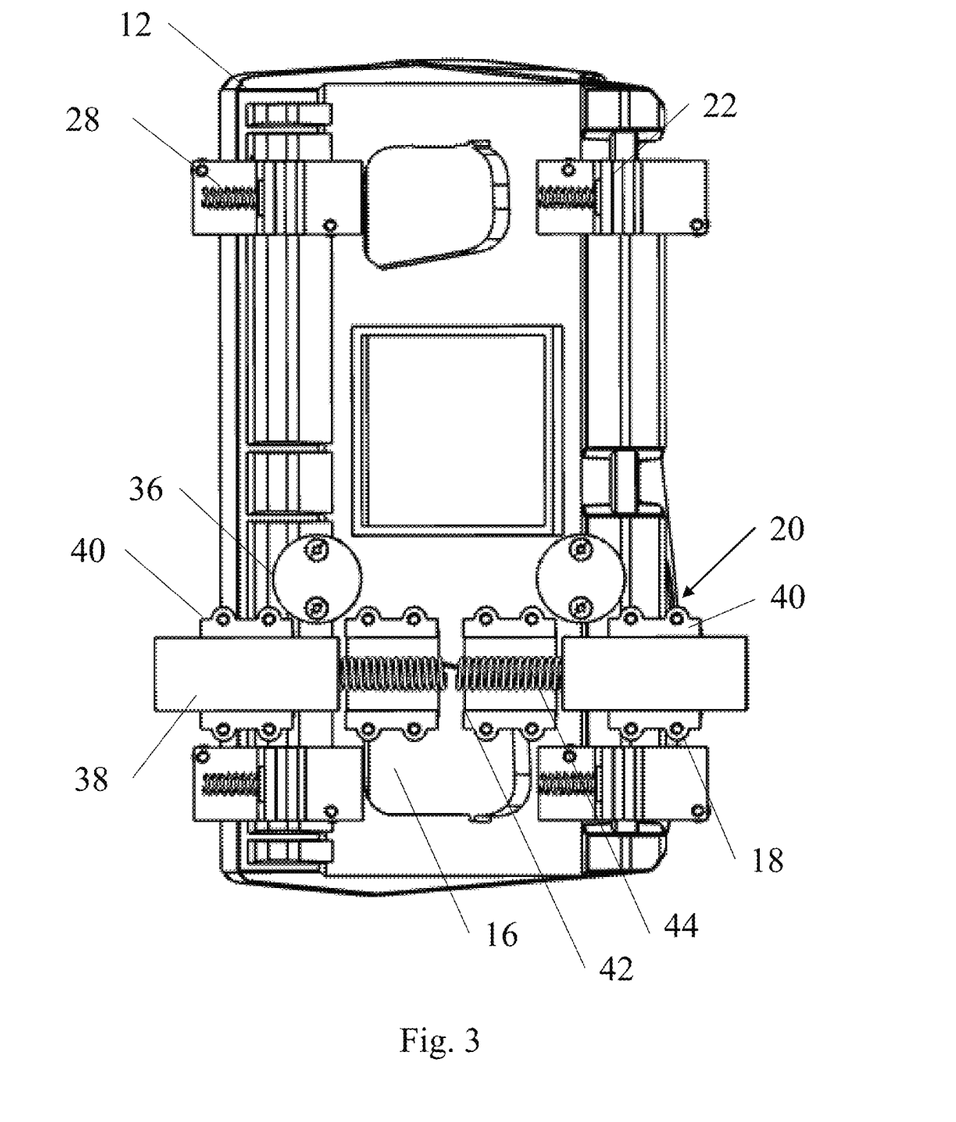
FIG. 3 depicts a front perspective view of the vehicle display height adjustment assembly.

FIG. 3 depicts a front view of the vehicle display height adjustment assembly. The bracket 16 is designed to be positioned between the bracket support members 22 and be slidably coupled. In this configuration the tolerance biasing elements 28 are located on the outside of the two bracket support members 22 on the left side and on the inside of the two bracket support members 22 on the right side. In other configurations the tolerance biasing elements 28 may be located on the inside or outside of all bracket support members 22. The tolerance biasing elements 28 shift the bracket support members 22 onto a support area in the display adapter 34. The support areas are in parallel within a specific range to decrease the tolerance range of the bracket support members 22 to each other. This prevents the system from jamming, and ensures it is robust and of high quality.

In this configuration the vehicle display height adjustment assembly contains two adjustment mechanisms 20. Both adjustment mechanisms 20 are engaged simultaneously in order to adjust the display system 10. This ensures that a user will need to use both hands to engage both adjustment mechanisms 20 and provide the required support to inhibit the display system 10 slipping into an unintended end position.

Each adjustment mechanism 20 is comprised of a lever 38, a first bracket element 40, a second bracket element 42, and a biasing member 44. The first bracket element 40 and the second bracket element 42 are coupled to the display adapter 34 via four adjustment mechanism fasteners 18 for each bracket. The first bracket element 40 supports the lever 38 and acts as a guide for when the lever 38 is slidably engaged. The second bracket element 42 supports the biasing member 44. In this configuration the second bracket element 42 acts as a guide for the biasing member 44. In other configurations the biasing member 44 and/or second bracket element 42 may be coupled to a dividing wall 46 shown in FIG. 4.

The fastening member 36 is located near the adjustment mechanism 20 and cooperates with the adjustment mechanism 20 to assist in retaining the location of the display cover 30 in relation to the bracket 16. When the fastening member 36 is in a locked position, the fastening member 36 provides sufficient force to retain display adapter 34 to the bracket 16.

Figure 4:
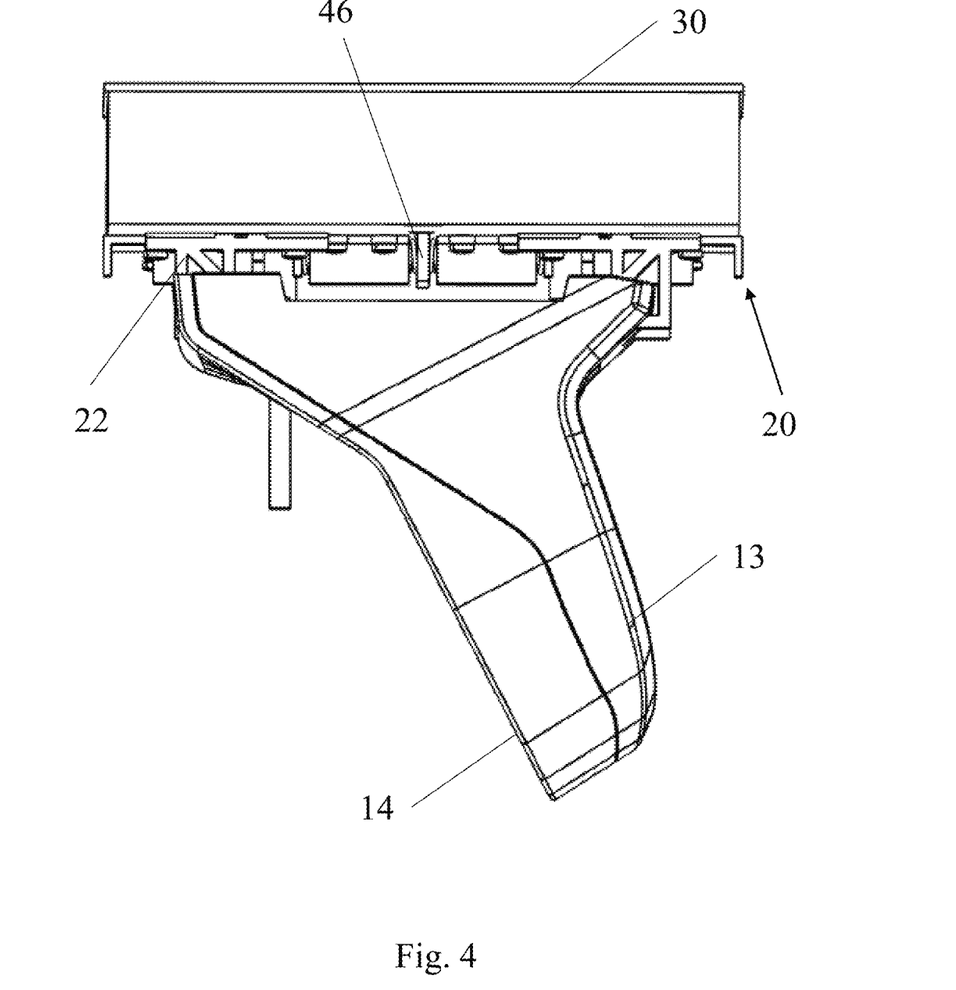
FIG. 4 depicts a top perspective view of the vehicle display height adjustment assembly.

In FIG. 4 a top perspective view of the vehicle display height adjustment assembly is shown. The inner bracket cover 13 and the outer bracket cover 14 cooperate to cover the bracket 16. The adjustment mechanism 20 cooperates with the bracket 16, the display adapter 34, and the display cover 30 to adjust the height of the display system 10. The cover 30 has the dividing wall 46 which in this form provides a physical barrier separating the two adjustment mechanisms 20.

FIG. 5 depicts a top perspective view of the vehicle display height adjustment assembly with the inner bracket cover 13, outer bracket cover 14, and display cover 30 removed. It best demonstrates how the bracket 16 is configured to fit within a receiving cavity 47 of the bracket support members 22. The bracket support members 22 slidably couple the bracket 16 to the display cover 30.

Figure 6:
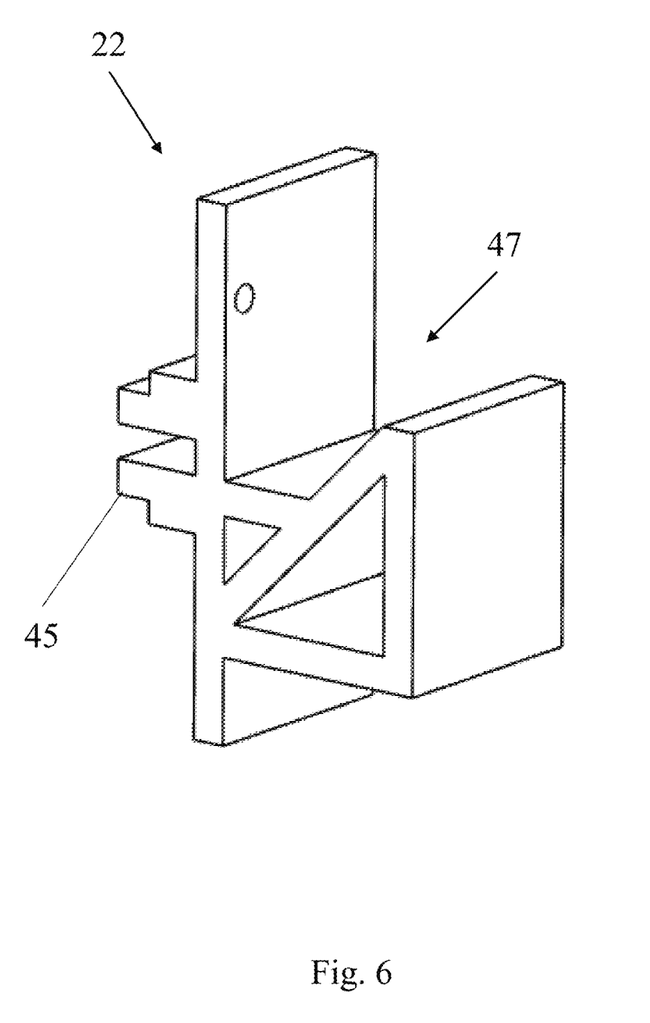
FIG. 6 depicts an isometric perspective view of a bracket support member. and covers removed.

FIG. 6 depicts an isometric perspective view of one bracket support member 22. Specifically, it illustrates the geometry of the receiving cavity 47 designed to engage the bracket 16. It also shows the side wall 45 that the tolerance biasing elements 28 abuts as seen in FIG. 3.

Figure 7:
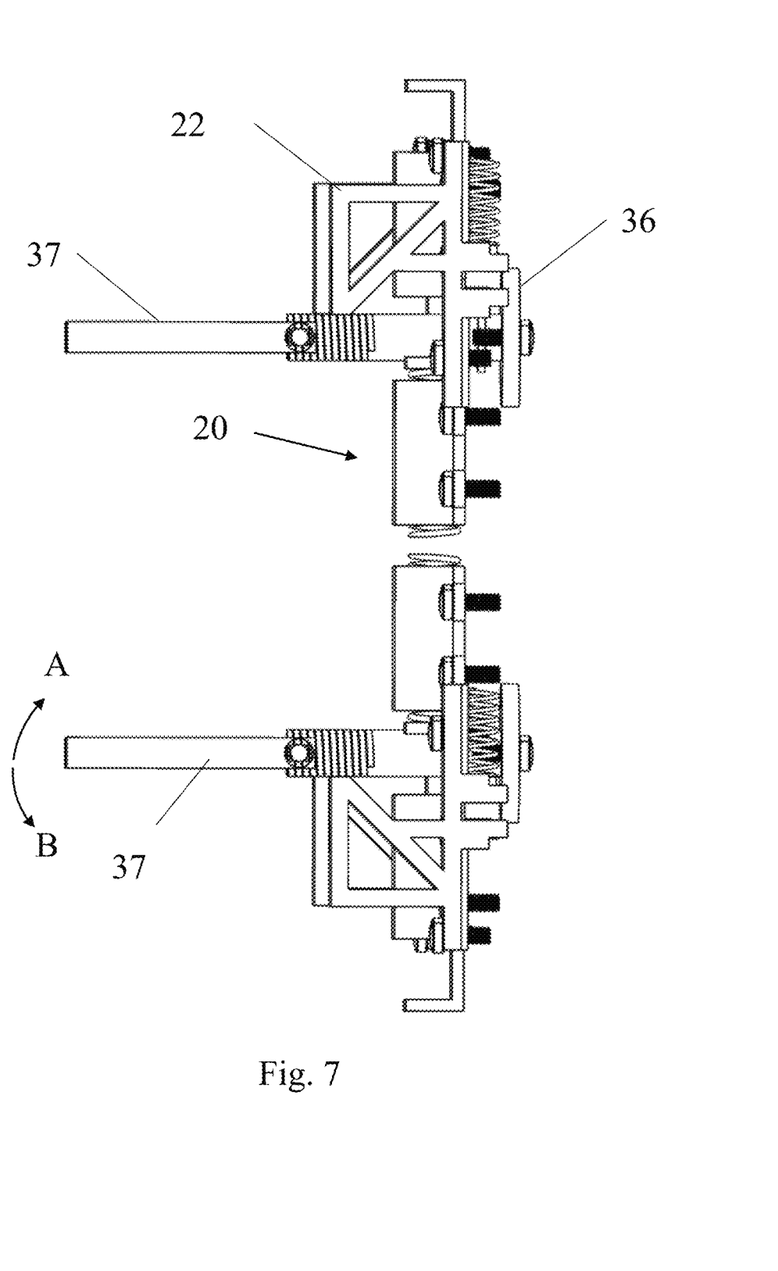
FIG. 7 depicts a top perspective view of the vehicle display height adjustment assembly with the bracket.

FIG. 7 depicts a top perspective view of the vehicle display height adjustment assembly with the bracket 16 removed. Each fastening member 36 includes a locking lever 37. FIG. 7 illustrates the locking levers 37 in an open position. When the locking levers 37 are in an open position, the fastening members 36 are unengaged and enable the movement of the adjustment mechanisms 20 and the display 10. When one locking lever 37 is rotated inwards in a first direction A, it shifts to a closed position and the respective fastening member 36 is engaged. When said fastening member 36 is engaged, the locking force provided by the fastening member 36, prevents movement of the display cover 30. From the closed position, the locking lever 37 is rotated in a second direction B to the open position.

Figure 8:
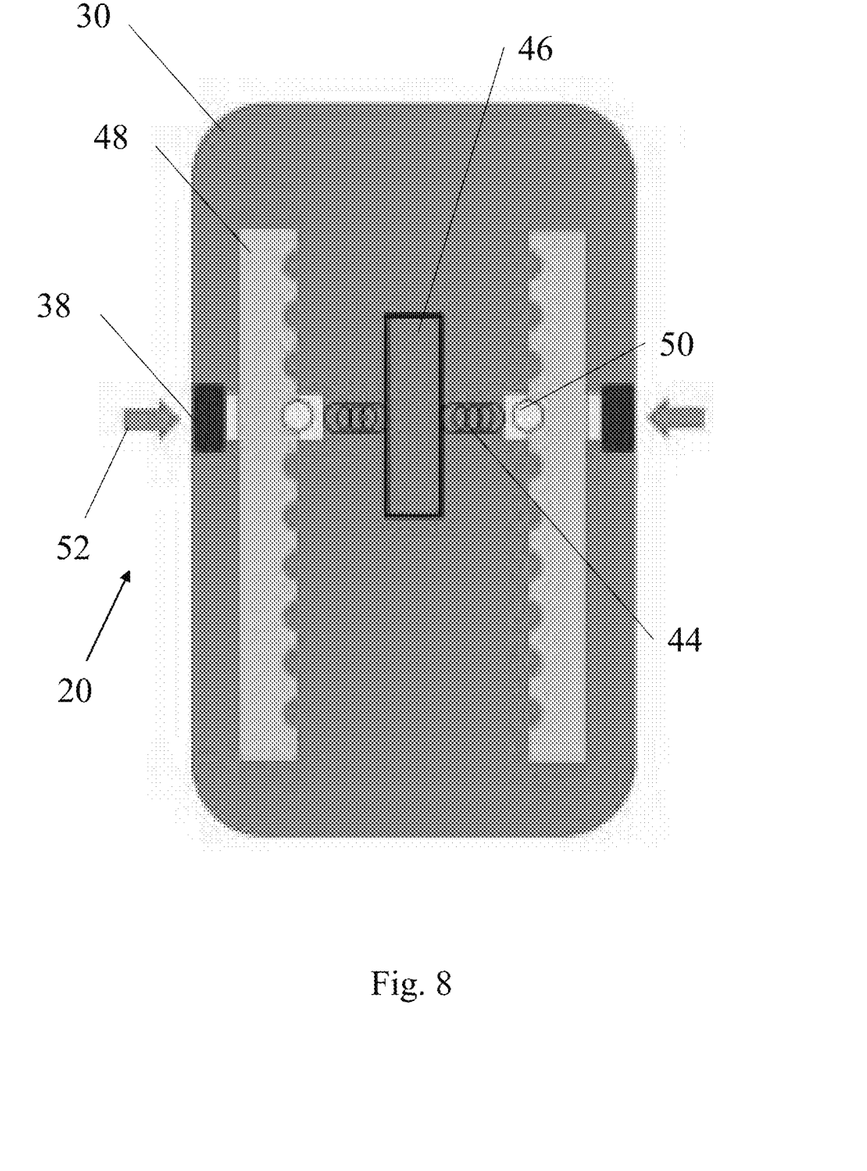
FIG. 8 depicts a front perspective view of the vehicle display height adjustment assembly emphasizing the height adjustment mechanism in a relaxed position.
Figure 9:
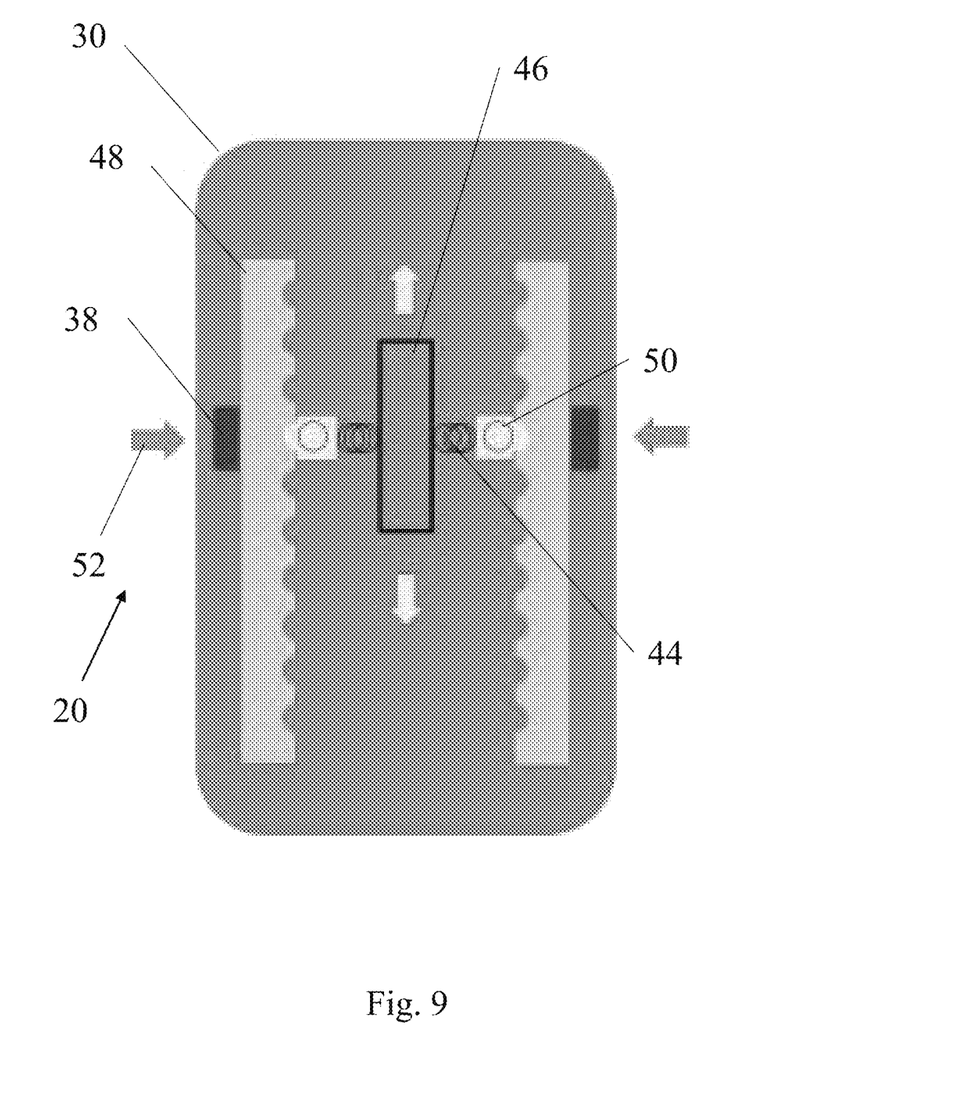
FIG. 9 depicts a front perspective view of the vehicle display height adjustment assembly emphasizing the height adjustment mechanism in an engaged position.
Figure 10:
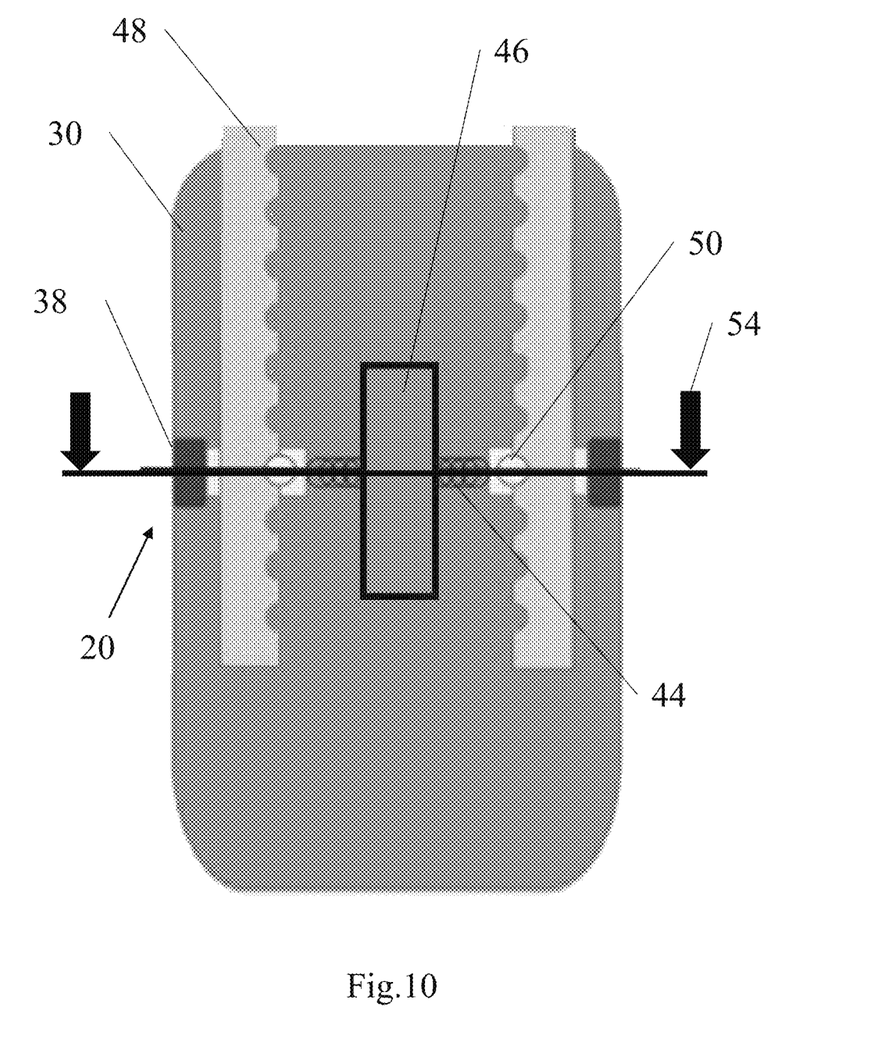
FIG. 10 depicts a front perspective view of the vehicle display height adjustment assembly emphasizing the height adjustment mechanism in an adjusted position.

FIGS. 8-10 illustrate front perspective views of the adjustment mechanisms 20, and specifically emphasizes the operation of the adjustment mechanisms 20. Each adjustment mechanism 20 cooperates with the bracket 16 to adjust the display cover 30 in relation to the bracket 16.

FIG. 8 depicts the adjustment mechanisms 20 in a locked state at a first position. In the first position, per adjustment mechanism 20, an adjustment pin 50 is biased by the biasing member 44 into a corresponding geometry on an adjustment rod 48. The adjustment rod 48 may be either integrally connected to the bracket 16 or detachably coupled to the bracket 16. The cooperation between the adjustment pin 50 and the adjustment rod 48 restricts movement of the adjustment mechanism 20 locking it into the first position. This in turn retains the display system 10 into a first position.

As depicted in FIG. 7, when the locking lever 37 of the fastening member 36 is in an upright position, the fastening member 36 is unengaged and enables the adjustment mechanism 20 to be engaged and the translation of the display 10. A first force 52 is applied to the lever 38. The lever engages and compresses the biasing member 44 against the dividing wall 46 translating the adjustment pin 50 out of the corresponding geometry of the adjustment rod 48 This disengages the adjustment pin 50 from the adjustment rod 48 and transitions the adjustment mechanism 20 into an unlocked state in the first position.

FIG. 9 illustrates the adjustment mechanism in an unlocked state at the first position. A second force 54 as shown in FIG. 10, may then be applied to the display cover 30 to move each adjustment mechanism 20 to a second desired position. When the first force 52 on the lever 38 is disengaged, the biasing member 44 is released to allow the adjustment pin 50 to reengage the adjustment rod 48. FIG. 10 illustrates the adjustment mechanism 20 in a locked state at the second position after a downward translation of the display 10. In this figure, the first force 52 on each lever 38 has been removed and the respective adjustment pins 50 are biased into the corresponding geometry on the adjustment rod 48. The adjustment mechanisms 20 and display system 10 are now retained at the second position.

Figures 11A, 11B:
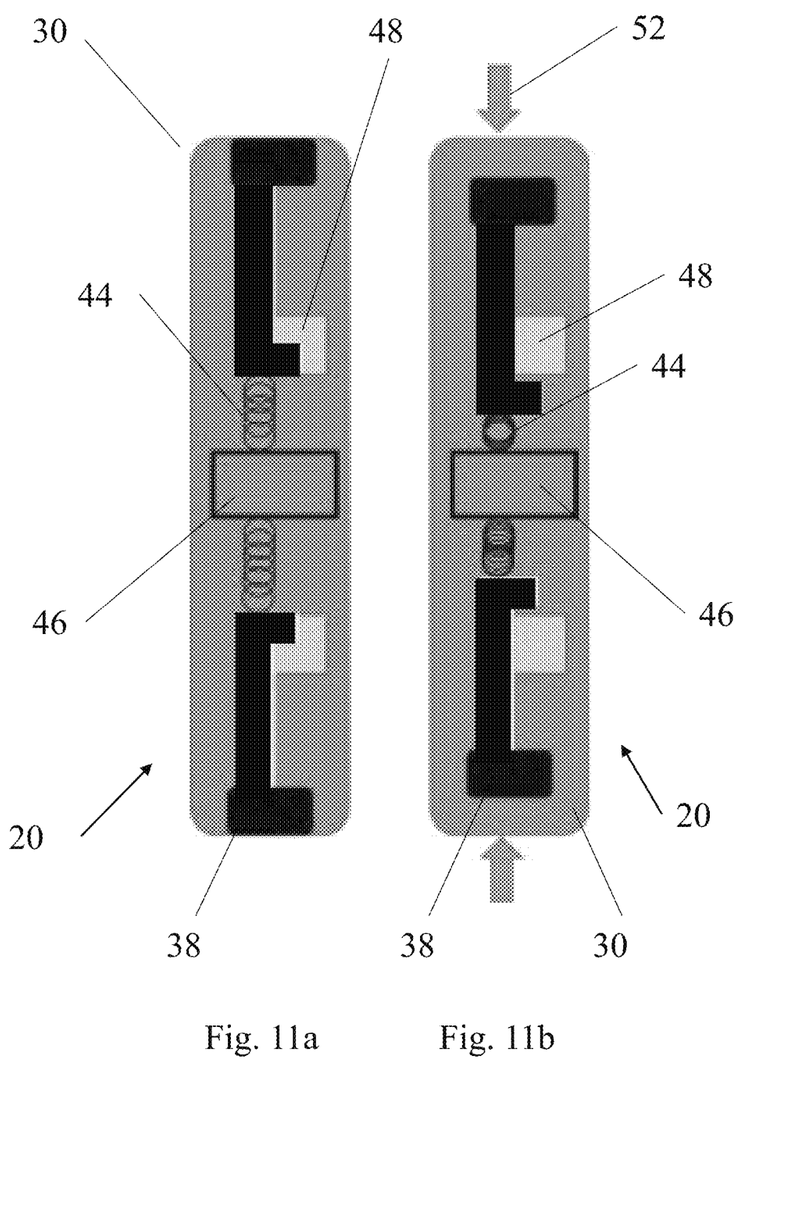
FIG. 11a depicts a top perspective view of the vehicle display height adjustment assembly emphasizing the height adjustment mechanism in a relaxed position.
FIG. 11b depicts a top perspective view of the vehicle display height adjustment assembly emphasizing the height adjustment mechanism in an engaged position.

FIGS. 11a and 11b illustrate a top perspective view of the adjustment mechanism 20, and specifically emphasizes the operation of the adjustment mechanisms 20. FIG. 11a depicts the adjustment mechanisms 20 in a locked state, and FIG. 11b depicts the adjustment mechanisms 20 in an unlocked state. As shown, the biasing members 44 cooperate with the levers 38 and the dividing wall 46. When a first force 52 is applied to the levers 38 the biasing members 44 are compressed against the dividing wall 46. As previously described, this then enables the adjustment mechanisms 20 and display 10 to be translated to a desired height position.

In the following an exemplary display height adjustment is described:
The display system 10 may be adjustable in height with a two hand adjustment. I.e. the driver may hold the display screen 11 encased within the bezel 12 in his hands, when a height adjustment is conducted. In a first step, the fixation via the eccentric fastening members 36 needs to be loosen by rotating the locking members 37. Then the driver may push the button-like levers 38 on the left and on the right sides. This pushes the adjustment pins 50 out of their positions within recesses provided by the respective adjustment rods 48 and the display screen 11 may be moved vertically. During said movement, the bracket 16 is guided between a dovetail geometry provided by the bracket support members 22. When an end-position is roughly found, the driver stops pushing the button-like levers 38, moves the display screen 11 slightly upwards or downwards until the adjustment pins 50 enter complementary recesses provided by the respective adjustment rods 48. As a last step, the fastening members 36 need to be tighten via the locking members 37. During the tightening, the driver no longer has to hold the display screen 11 encased within the bezel 12.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. The features of the disclosure disclosed in the foregoing description, in the drawings and in the claims can be essential both individually and in any combination for the implementation of the disclosure in its various embodiments.

REFERENCE SIGNS

1—Vehicle
10—Display System
11—Display Screen
12—Bezel
13—Inner Bracket Cover
14—Outer Bracket Cover
16—Bracket
18—Adjustment Mechanism Fasteners
20—Adjustment Mechanism
22—Bracket Support Member
24—Bracket Support Fasteners
26—First Gasket
28—Tolerance Biasing Element
30—Display Cover
32—Second Gasket
34—Display Adapter
36—Fastening Member
37—Locking Lever
38—Lever
40—First bracket element
42—Second bracket element
44—Biasing Member
45—Side Wall
46—Dividing Wall
47—Receiving Cavity
48—Adjustment rod
50—Adjustment Pin
52—First Force
54—Second Force
A—First Direction
B—Second Direction

The invention claimed is:

1. A vehicle display system, comprising:
a bracket;
a bracket support member that includes a receiving cavity to retain the bracket;
a display cover coupled to the bracket support member;
a display adapter coupled to the display cover; and
an adjustment mechanism coupled to the display cover, wherein the adjustment mechanism comprises
a mounting member that couples to the display adapter, wherein the mounting member comprises a first bracket element and a second bracket element,
a lever that is slidably engaged within the first bracket element, and
a biasing element supported by the second bracket element,
wherein the biasing element cooperates with the lever such that, when a first force is applied to the lever the biasing element is compressed to enable the adjustment mechanism to be translated to a desired position.

2. The vehicle display system of claim 1, further comprising
a fastening member for coupling the display adapter to the display cover such that, when the fastening member is loosened, the adjustment mechanism is functional to enable movement of the display cover in relation to the bracket, and when the fastening member is tightened, movement of the adjustment mechanism is restricted.

3. The vehicle display system of claim 2, wherein the fastening member comprises a locking lever that is rotatable between an open position loosening the fastening member and a closed position tightening the fastening member.

4. The vehicle display system of claim 2, wherein the fastening member comprises an eccentric screw.

5. The vehicle display system of claim 2, further comprising
a first gasket located between the bracket support member and the display cover, and
a second gasket located between the display cover and the display adapter.

6. The vehicle display system of claim 5, wherein the second gasket is configured to fit on the fastening member.

7. The vehicle display system of claim 5, wherein a tolerance biasing element is disposed between the display cover and the first gasket.

8. The vehicle display system of claim 7, wherein the tolerance biasing element is disposed on either inside or outside of the bracket support member.

9. The vehicle display system of claim 7, wherein the tolerance biasing element cooperates with a side wall of the bracket support member and the display cover to ensure alignment of the bracket support member.

10. The vehicle display system of claim 7, wherein the tolerance biasing element cooperates with the display adapter and the bracket support member to ensure a proper mounted alignment.

11. The vehicle display system of claim 1, wherein the adjustment mechanism further comprises:
an adjustment pin that cooperates with the biasing element; and
an adjustment rod that cooperates with the adjustment pin.

12. The vehicle display system of claim 11, wherein the adjustment rod is integrally connected to the bracket or detachably coupled to the bracket.

13. The vehicle display system of claim 1, further comprising a dividing wall.

14. The vehicle display system of claim 13, wherein the cover has the dividing wall as a physical barrier separating two adjustment mechanisms.

15. The vehicle display system of claim 13, wherein biasing members of two adjustment mechanisms cooperate with respective levers and the dividing wall such that, when a first force is applied to the levers the biasing members are compressed against the dividing wall to enable the two adjustment mechanisms and a display screen to be translated to a desired height position.

16. The vehicle display system of claim 13, wherein the lever engages and compresses the biasing member against the dividing wall for translating an adjustment pin of the adjustment mechanism out of corresponding geometry of an adjustment rod of the adjustment mechanism.

17. The vehicle display system of claim 1, wherein the vehicle display system includes two or four adjustment mechanisms, with each of a plurality of fastening members cooperating with one of the two or four adjustment mechanisms retaining a location of the display cover in relation to the bracket when the fastening member is in a locked position.

18. The vehicle display system of claim 1, wherein the vehicle display system includes at least two bracket support members between which the bracket can be vertically moved for a height adjustment.

19. The vehicle display system of claim 18, wherein the at least two bracket support members provide a dovetail guiding.

20. The vehicle display system of claim 1, wherein the vehicle display system includes four bracket support members, each located in proximity to one of four corners of the bracket.

21. The vehicle display system of claim 1, wherein the vehicle display system includes two gaskets located between the bracket support member and the display cover.

22. The vehicle display system of claim 21, wherein the gaskets are injected into the vehicle display system during assembly.

23. The vehicle display system of claim 1, further comprising a display screen coupled with the display adapter.

24. The vehicle display system of claim 23, further comprising a bezel that encases the display screen.

25. The vehicle display system of claim 23, wherein the display screen comprises bonded glass.

26. The vehicle display system of claim 1, wherein the display adapter and/or the bracket is constructed from aluminum or a high-tech plastic material.

* * * * *